United States Patent
Jing

(10) Patent No.: US 6,208,777 B1
(45) Date of Patent: Mar. 27, 2001

(54) ACTUATOR ASSEMBLY FOR OPTICAL SWITCHES

(75) Inventor: Xingliang Jing, Fremont, CA (US)

(73) Assignee: Primawave Photonics, Inc., Fremont, CA (US)

( * ) Notice: Subject to any disclaimer, the term of this patent is extended or adjusted under 35 U.S.C. 154(b) by 0 days.

(21) Appl. No.: 09/416,444

(22) Filed: Oct. 12, 1999

(51) Int. Cl.[7] .................................................... G02B 6/26
(52) U.S. Cl. .................................. 385/16; 385/19; 385/20
(58) Field of Search ........................................ 385/16–24

(56) References Cited

U.S. PATENT DOCUMENTS

| | | |
|---|---|---|
| 4,834,488 | 5/1989 | Lee ...................................... 350/96.2 |
| 5,420,946 | 5/1995 | Tsai ........................................ 385/22 |
| 5,436,986 | 7/1995 | Tsai ........................................ 385/16 |
| 5,438,449 | 8/1995 | Chabot et al. ........................ 359/216 |
| 5,479,541 | 12/1995 | Pan .......................................... 385/22 |
| 5,594,820 | 1/1997 | Garel-Jones et al. ................... 385/22 |
| 5,611,009 | 3/1997 | Pan .......................................... 385/22 |
| 5,642,446 | 6/1997 | Tsai ........................................ 385/16 |
| 5,742,712 | 4/1998 | Pan et al. ............................... 385/18 |
| 5,815,614 | 9/1998 | Pan .......................................... 385/22 |
| 5,828,800 | 10/1998 | Henry et al. ............................ 385/20 |
| 5,838,847 | * 11/1998 | Pan et al. ............................... 385/18 |
| 5,867,617 | 2/1999 | Pan et al. ............................... 385/18 |
| 5,920,665 | 7/1999 | Presby .................................... 385/16 |
| 5,923,798 | 7/1999 | Aksyuk et al. ......................... 385/19 |

* cited by examiner

*Primary Examiner*—Phan T. H. Palmer

(57) ABSTRACT

A mechanical assembly for an optical switch comprises an actuator, an axle assembly, a lever pivotably connected to the axle assembly to transfer mechanical movements generated by the actuator, and an optical switching element, connected to the lever, capable of being switched between its on and off positions by mechanical movements of the actuator.

69 Claims, 5 Drawing Sheets

ACTUATOR ASSEMBLY FOR OPTICAL SWITCHES

BACKGROUND OF THE INVENTION

1. Field of the Invention

The present invention relates to optical switches, and more particularly, to an actuator assembly for optical switches.

2. Background

Optical switches have been developed for switching optical networks in broadband telecommunications systems. Because of increasing demand for high speed broadband data communications, optical wavebands including infrared and visible light wavelengths are increasingly being used as data carriers in telecommunications systems to satisfy the demand for high speed broadband data transmission. Conventional optical switches have been implemented in a typical optical fiber telecommunications network to switch the optical paths of information-carrying light to different optical fiber cables.

Conventional optical switches typically fall into two broad categories of non-integrated optical switches and integrated optical switches. Among the non-integrated optical switches, moving fibers have been used to change optical paths between different input or output fibers. In a conventional moving fiber switch, either the input optical fibers or the output optical fibers are moved mechanically to switch the optical path between different input or output optical fibers.

However, conventional moving fiber switches typically suffer from alignment problems because it is difficult to align the input and output fibers with a high degree of accuracy and repeatability. Alignment of single mode fibers can be especially difficult because of their small diameters. Even a slight misalignment between the selected input and output fibers through which optical transmission supposedly occurs may result in an unacceptably high insertion loss because the output fiber is not in the perfect position on the optical path to receive the light transmitted from the input fiber.

In order to avoid the problem of misalignment in a typical fiber moving switch, expensive and complicated mechanisms are usually required to move either the input or the output optical fibers to achieve acceptable alignment accuracy and repeatability. Furthermore, conventional moving fiber switches typically have slow switching speeds which may limit their applications in optical fiber communications networks which require high-speed switching operations.

Moving reflectors have also been used in conventional non-integrated optical switches to switch optical paths between different input or output optical fibers instead of moving the input or output fibers for optical alignment. Moving reflector switches are usually capable of faster switching operations than conventional moving fiber switches. However, conventional reflector switches typically also suffer from the problems of mechanical stability and repeatability. After a large number of repeated on and off switching operations, the optical reflectors in a conventional reflector switch may deviate from their designed reflection angles because of the problems with mechanical stability and repeatability. Even a slight deviation of reflection angle may cause the optical path of reflected light to be misaligned with a respective output fiber or another reflector which is supposedly positioned to receive the reflected light.

Therefore, there is a need for an optical switch with a high degree of reliability after a large number of repeated on and off switching operations which are typically required in modern optical fiber communications networks. Furthermore, there is a need for an inexpensive mechanical assembly which allows optical switches to maintain a high degree of reliability and accuracy after a large number of repeated switching operations.

SUMMARY OF THE INVENTION

The present invention provides a mechanical assembly for an optical switch, roughly comprising:

(a) an actuator capable of generating repetitive movements in opposite directions;

(b) an axle assembly, comprising:
   (i) a hollow cylindrical shaft rotatable about a center axis, the cylindrical shaft comprising an exterior sidewall and an interior sidewall defining a hollow interior and an open end;
   (ii) a screw fastened to the interior sidewall of the cylindrical shaft through the open end;
   (iii) first and second ball bearings each comprising an inner annulus, an outer annulus and a plurality of balls movably positioned between the inner and outer annuli, the inner annuli of the ball bearings attached to the exterior sidewall of the cylindrical shaft; and
   (iv) a spacer positioned between the first and second ball bearings;

(c) a lever connected to the actuator and the axle assembly, the lever pivoted about the center axis of the cylindrical shaft; and (d) an optical switching element, connected to the lever, capable of moving repetitively in opposite directions in response to repetitive movements generated by the actuator.

In an embodiment, the mechanical assembly according to the present invention further comprises a flexible connector between the actuator and the lever to transfer mechanical movements from the actuator to the lever. In a further embodiment, the flexible connector comprises at least two bent metal wires to avoid or at least to reduce the possibility of resonance induced by the mechanical forces generated by the actuator.

In an embodiment in which the optical switch is supported by a perforated support plate, a portion of the lever adjacent the optical switching element is movably positioned through the aperture to drive the optical switching element between its on and off positions. In a further embodiment, the mechanical assembly further comprises first and second blocks fixedly connected to the support plate for stopping further movements of the lever to set the optical switching element in its on and off positions.

In an embodiment, the actuator comprises a relay switch to provide repetitive movements for the optical switching element through the lever and the flexible connector. In an embodiment, a fixed member is attached to the support plate to support the axle assembly. In a further embodiment, the actuator is connected to the fixed member which also supports the axle assembly. In an alternate embodiment, the actuator is directly connected to the support plate.

Advantageously, the mechanical assembly according to the present invention can be used to move an optical switching element either to intercept an optical path when it is switched to an on position or to move away from the optical path when it is switched to an off position, with a high degree of mechanical reliability for accurate optical alignment even after a large number of repeated on and off switching operations. Furthermore, a high degree of mechanical stability can be maintained even if an inexpensive conventional solenoid relay switch is implemented as the actuator in the mechanical assembly according to the present invention, thereby allowing the cost of the optical switch to be reduced.

BRIEF DESCRIPTION OF THE DRAWINGS

The invention will be described with respect to particular embodiments thereof, and references will be made to the drawings in which.

DETAILED DESCRIPTION

Figure 1:
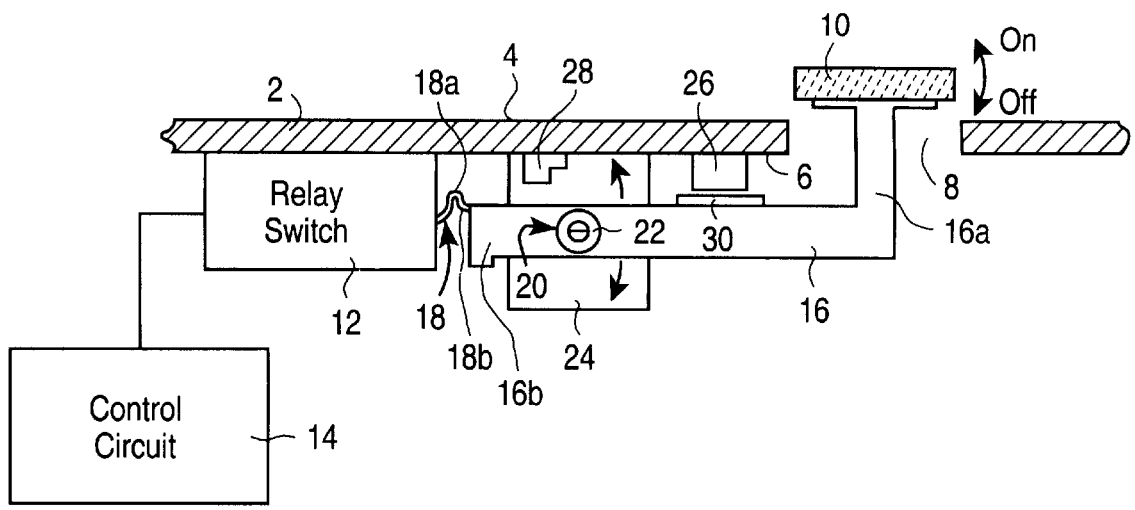
FIG. 1 shows a sectional view of an embodiment of a mechanical assembly for an optical switch according to the present invention.

FIG. 1 shows a sectional view of an embodiment of a mechanical assembly for an optical switch according to the present invention. In FIG. 1, a perforated support plate 2 has a first surface 4 and a second surface 6 opposite each other, with at least one aperture 8 to allow mechanical switching movements of an optical switching element 10, which in an embodiment comprises a prism as shown in the sectional view of FIG. 1.

In the embodiment shown in FIG. 1, an actuator 12 which comprises a relay switch is provided on the second surface 6 of the support plate 2. The actuator 12 is capable of generating repetitive movements in opposite directions in response to control voltages generated by a control circuit 14. In an embodiment according to the present invention, the actuator 12 comprises a conventional commercially available solenoid relay switch activated by a conventional control circuit 14 which can be easily implemented by a person of ordinary skill in the art to generate control voltages for the relay switch 12. In the embodiment shown in FIG. 1, the relay switch 12 is capable of generating repetitive motions in up and down directions roughly perpendicular to the surfaces 4 and 6 of the support plate 2.

As shown in FIG. 1, a lever 16 is provided in the mechanical assembly to transfer the mechanical movements generated by the relay switch 12 to the optical switching element 10. In an embodiment, the mechanical assembly according to the present invention further comprises a flexible connector 18 which is connected between the relay switch 12 and the lever 16. In a further embodiment, the flexible connector 18 comprises at least two flexible metal wires 18a and 18b to transfer mechanical movements from the relay switch 12 to the lever 16.

The metal wires may be thin flexible steel wires which are capable of transferring mechanical movements from the relay switch 12 to the lever 16 with sufficient damping to avoid resonance. In a further embodiment, the flexible connector 18 comprises two bent metal wires having different resonant frequencies such that the two metal wires 18a and 18b do not resonate together when mechanical forces are applied to the metal wires by the relay switch 12.

Furthermore, the two bent metal wires 18a and 18b can be shaped arbitrarily because they need not have the same length or conform to some predetermined shape. In order to avoid resonance, it may even be desirable that the flexible bent metal wires 18a and 18b have arbitrary shapes. Because no stringent mechanical tolerances or specifications are needed for making the flexible connector 18, the cost of manufacturing optical switches can be reduced significantly by implementing the mechanical assemblies according to the present invention.

As shown in FIG. 1, means 20 for stably pivoting the lever 16 is provided to ensure accurate and stable positioning of the optical switching element 10 in its on or off position and to withstand a large number of repeated switching operations. In an embodiment, the means 20 for stably pivoting the lever 16 comprises an axle assembly 22 which is supported by a fixed member 24 attached to the second surface 6 of the support plate 2.

In an embodiment in which the support plate comprises a metal plate, the fixed member 24 for supporting the axle assembly 22 may be a metal block attached to the second surface 6 of the support plate 2. For example, the fixed member 24 may be formed integrally with the metal support plate 2 by conventional molding. Alternatively, the fixed member 24 may be soldered to the support plate 2 in a conventional manner which is apparent to a person of ordinary skill in the art. Other methods can be used to attach the fixed member 24 to the support plate 2. For example, they may be fastened together with screws or attached together by using an adhesive. An embodiment of the axle assembly 22 for pivoting the lever 16 will be described in further detail below in reference to FIGS. 3 and 4.

In an embodiment, the mechanical assembly according to the present invention further comprises first and second blocks 26 and 28 which are fixedly connected to the second surface 6 of the support plate 2. The first block 26 is positioned to stop a portion 16a of the lever 16 between the optical switching element 10 and the axle assembly 22 from moving further upward when the optical switching element 10 reaches its on position, which in the embodiment shown in FIG. 1 is a predetermined position above the aperture 8 of the support plate 2 to intercept an optical path. The second block 28 is positioned to stop a second portion 16b of the lever 16 between the axle assembly 22 and the flexible connector 18 from moving further upward when the optical switching element 10 reaches its off position inside the aperture 8 of the support plate 2 in the embodiment shown in FIG. 1.

In FIG. 1, an optional contact pad 30 is provided on the lever 16 opposite the first block 26. When the contact pad 30 is in contact with the first block 26, the optical switching element 10 is securely in its on position. Because the accuracy of the on position of the optical switching element 10 is generally more critical than the accuracy of its off position, the contact pad 30 and the first block 26 are machined to ensure that when they are in contact with each other, the optical switching element 10 is in its correct on position.

The second block 28 is positioned to stop further movement of the portion 16b of the lever 16 when the optical switching element 10 reaches its off position within the aperture 8 of the support plate 2. Since the accuracy of the off position of the optical switching element 10 is generally not critical as long as the optical switching element 10 is moved completely away from the optical path, no contact pad is provided on the portion 16b of the lever 16 between the axle assembly 22 and the flexible connector 18 in the embodiment as shown in FIG. 1.

The first and second metal blocks 26 and 28 may be formed integrally with the metal support plate 2 by conventional molding. Alternatively, the metal blocks 26 and 28 may be soldered onto the second surface 6 of the support plate 2, or attached to the support plate 2 in another conventional manner which is apparent to a person skilled in the art. For example, the metal blocks 26 and 28 may be fastened to the support plate 2 by screws, or attached to the support plate 2 by using an adhesive.

In the embodiment shown in FIG. 1, the optical switching element 10 is in its on position to intercept an optical path above the first surface 4 of the support plate 2 while a large portion of the mechanical assembly for actuating the optical switching element 10 is positioned below the second surface 6 of the support plate 2. Furthermore, the off position of the optical switching element 10 is within the aperture 8 of the support plate 2 in the embodiments described above. The optical path, which is above the first surface 4 of the support plate 2, is substantially parallel to the support plate 2 to avoid any reflection by the first surface 4 of the support plate 2. Depending upon the height of the optical path which the optical switching element 10 is designed to intercept in its on position, it may be unnecessary that the optical switching element 10 be moved completely inside the aperture 8 as it is switched off from the optical path above the first surface 4 of the support plate 2. The optical switching element 10 may have an off position which is a lower position above the aperture 9 but completely away from the optical path in a different embodiment. In another embodiment, the off position of the optical switching element 10 is below the second surface 6 of the support plate 2.

Figure 5:
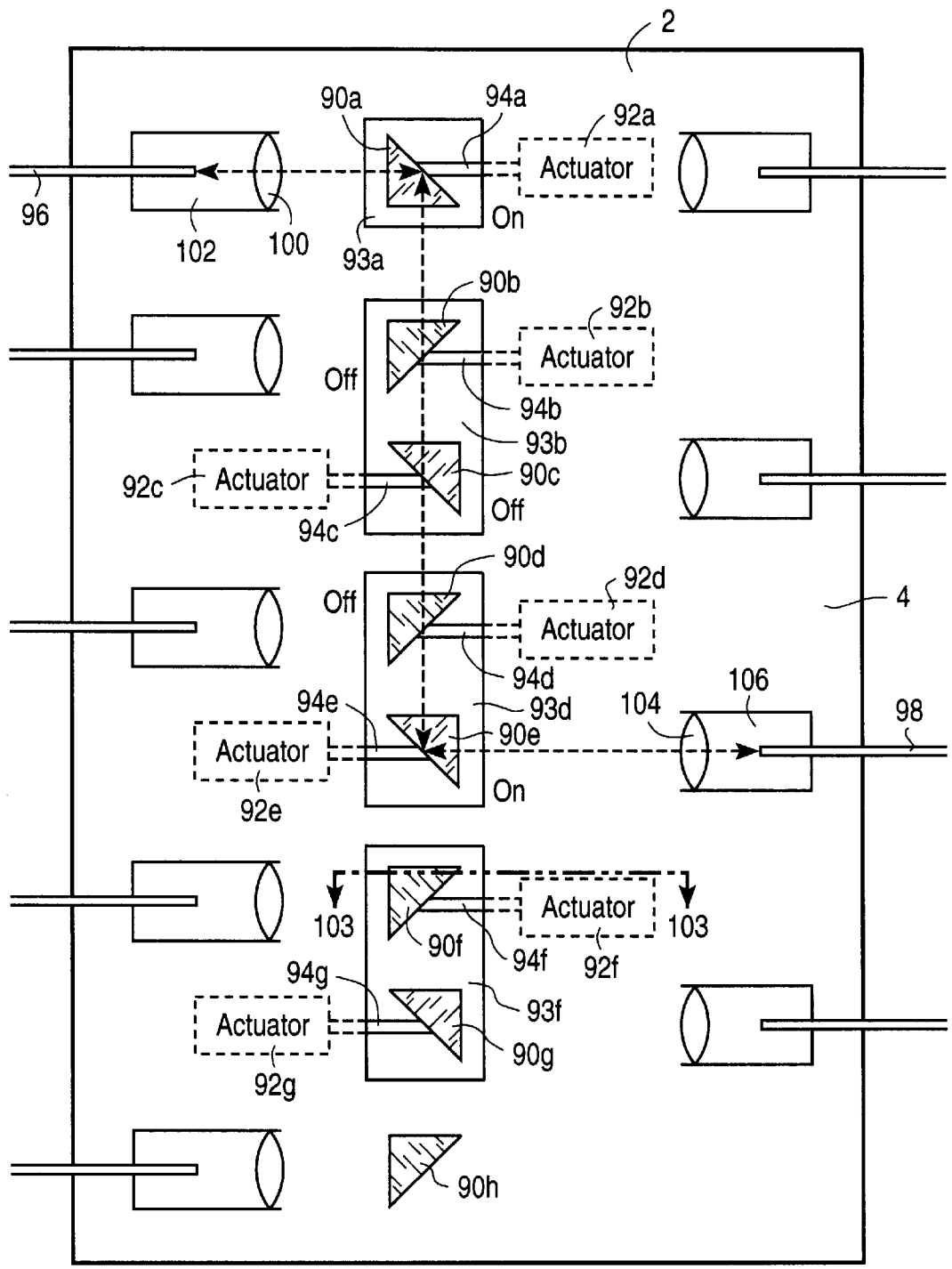
FIG. 5 shows a top plan view of a 1×N optical switch in which the mechanical assemblies according to the present invention can be implemented.
Figure 6:
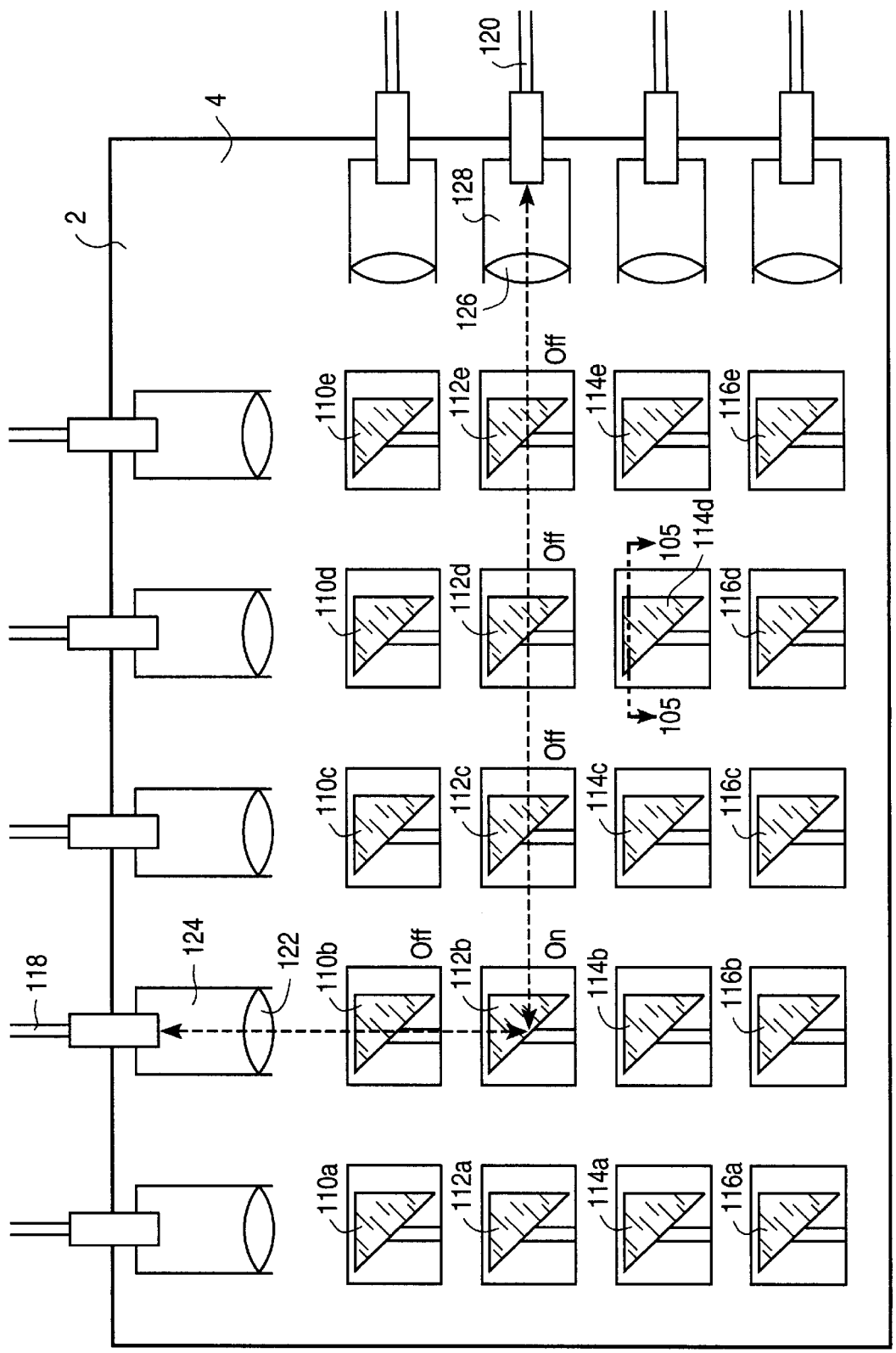
FIG. 6 shows a top plan view of an M×N optical switch in which the mechanical assemblies according to the present invention can be implemented.

In an embodiment, the optical switching element comprises an optical reflector to reflect incident light onto a different optical path. The optical switching element may be a mirror, a prism, or another type of reflector. Furthermore, the mechanical assembly according to the present invention is applicable to various types of mechanically actuated optical switches in addition to reflector switches as described in the embodiments. Examples of mechanically actuated reflector switches will be described below with references to the top plan views of FIGS. 5 and 6 illustrating optical paths above the first surface 4 of the support plate 2.

Figure 2:
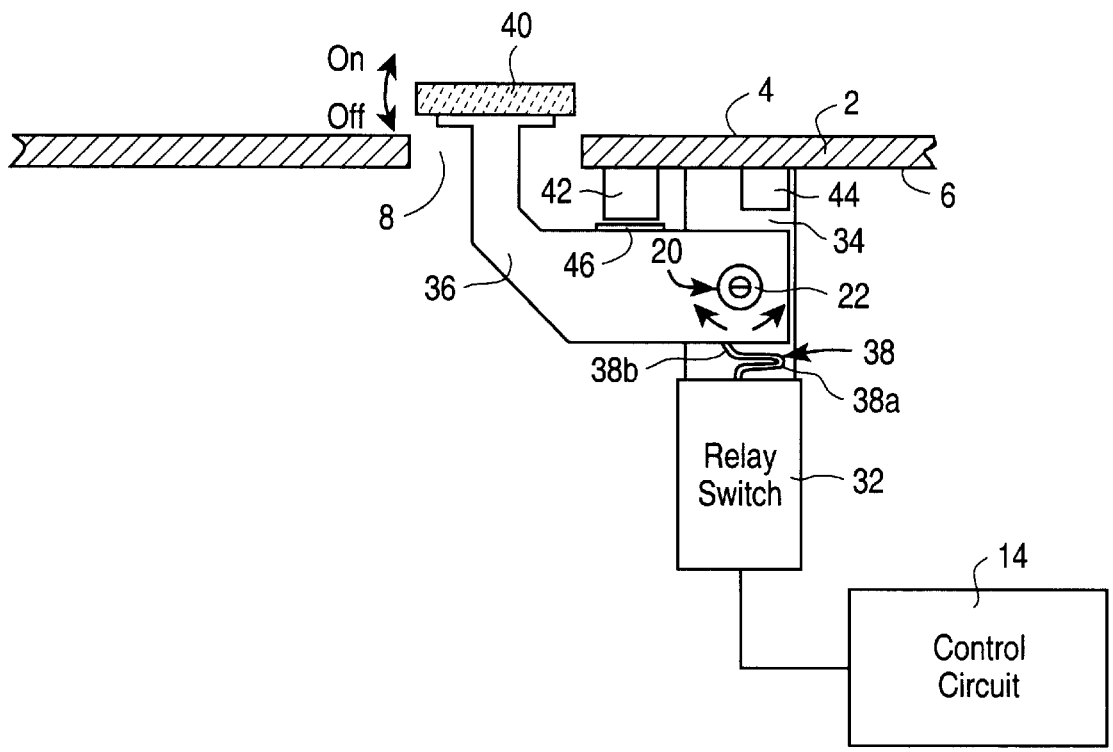
FIG. 2 shows a sectional view of another embodiment of a mechanical assembly for an optical switch according to the present invention.

FIG. 2 shows a sectional view of another embodiment of the mechanical assembly for an optical switch in accordance with the present invention. Whereas FIG. 1 shows the relay switch 12 as being horizontally mounted to the second surface 6 of the support plate 2, FIG. 2 shows a relay switch 32 as being vertically mounted to a fixed member 34 which also supports the means 20 for stably pivoting a lever 36. In an embodiment, the means 20 for stably pivoting a lever 36 comprises an axle assembly 22 which is identical to the axle assembly described above in reference to FIG. 1. The axle assembly 22 will be described in further detail below in reference to FIGS. 3 and 4.

The fixed member 34 may be a metal block formed integrally with the metal support plate 2 by conventional molding. Alternatively, the fixed member 34 may be attached to the second surface 6 of the support plate 2 by soldering or in another conventional manner which is apparent to a person skilled in the art. For example, the fixed member 34 may be fastened to the support plate 2 with screws, or attached to the support plate 2 by using an adhesive. The relay switch 32, which is directly attached to the fixed member 34 in the embodiment shown in FIG. 2, is fixedly positioned with respect to the support plate 2. In contrast with the relay switch 12 in FIG. 1, the relay switch 32 in FIG. 2 is capable of generating repetitive movements in left and right directions roughly parallel to the support plate 2.

In an embodiment, the movements generated by the relay switch 32 are transferred to the lever 36 through a flexible connector 38, which in an embodiment comprises at least two flexible metal wires 38a and 38b having different resonant frequencies. In a further embodiment, the metal wires 38a and 38b are arbitrarily bent such that mechanical forces generated by the relay switch 32 are damped to prevent resonance from occurring in the mechanical assembly according to the present invention.

An optical switching element 40, which is shown as an optical reflector in FIG. 2, is connected to the lever 36 and is capable of repetitive movements between its on and off positions in response to repetitive mechanical movements generated by the relay switch 32. The lever 36 is shaped such that roughly horizontal movements generated by the relay switch 32 are translated into roughly vertical movements of the optical switching element 40. The relay switch 32, which in an embodiment comprises a conventional solenoid relay switch known to a person skilled in the art, can be activated by control voltages generated by a conventional control circuit 14 in a manner apparent to a person skilled in the art.

In the embodiment shown in FIG. 2, the mechanical assembly according to the present invention further comprises first and second blocks 42 and 44 which are fixedly connected to the second surface 6 of the support plate 2. The first block 42 is positioned to stop the lever 36 from moving farther when the optical switching element 40 reaches its on position to intercept an optical path above the aperture 8 of the support plate 2. In the embodiment shown in FIG. 2, a contact pad 46 is provided on the lever 36 opposite the first block 42, such that when the first block 42 and the contact pad 46 are in contact with each other, the optical switching element 40 is stopped precisely in its on position. The contact pad 46 and the first block 42 are machined to ensure that the optical switching element 40 is precisely positioned to intercept its intended optical path after it reaches its on position.

The second block 44 is positioned to stop the lever 36 from moving farther in an opposite direction after the optical switching element 40 reaches its off position. Because the accuracy of the off position of the optical switching element 40 is not as critical as its on position, the second block 44 need not be machined very precisely as long as it is able to stop the lever 36 from further movement when the optical switching element 40 reaches its off position.

The first and second blocks 42 and 44 may be metal blocks formed integrally with the metal support plate 2 by conventional molding. Alternatively, the blocks 42 and 44 may be soldered to the second surface 6 of the support plate 2 or attached to the support plate 2 in another conventional manner which is apparent to a person skilled in the art. For example, the metal blocks 42 and 44 may be fastened to the support plate 2 with screws, or attached to the support plate 2 by using an adhesive. The embodiment as shown in FIG. 2 is also applicable to various types of optical switches including 1×N and M×N optical switches which will be described below in reference to FIGS. 5 and 6.

Figure 3:
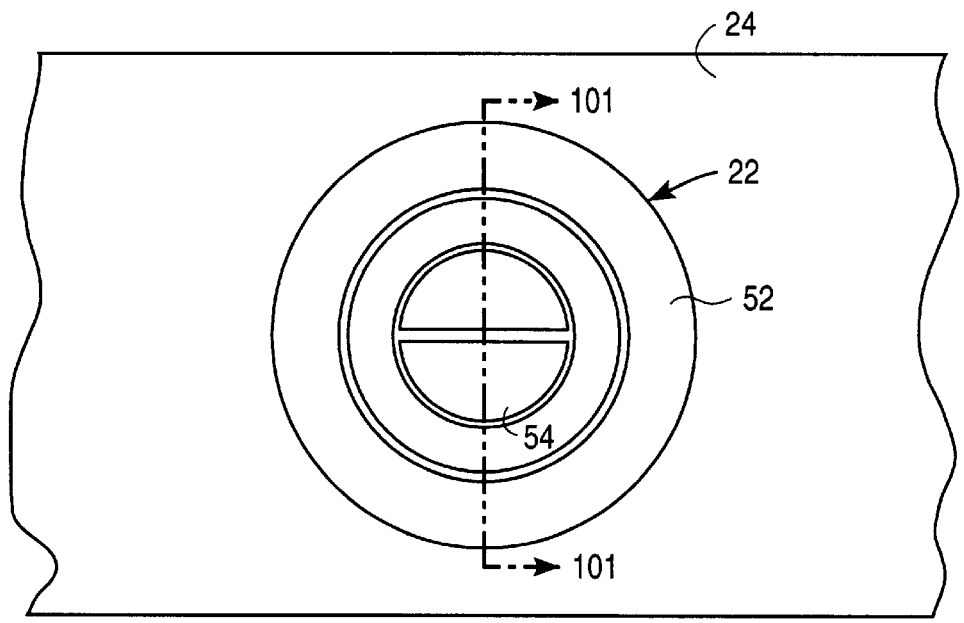
FIG. 3 shows an exploded view of an axle assembly for pivoting a lever in the mechanical assembly of FIG. 1 or FIG. 2.
Figure 4:
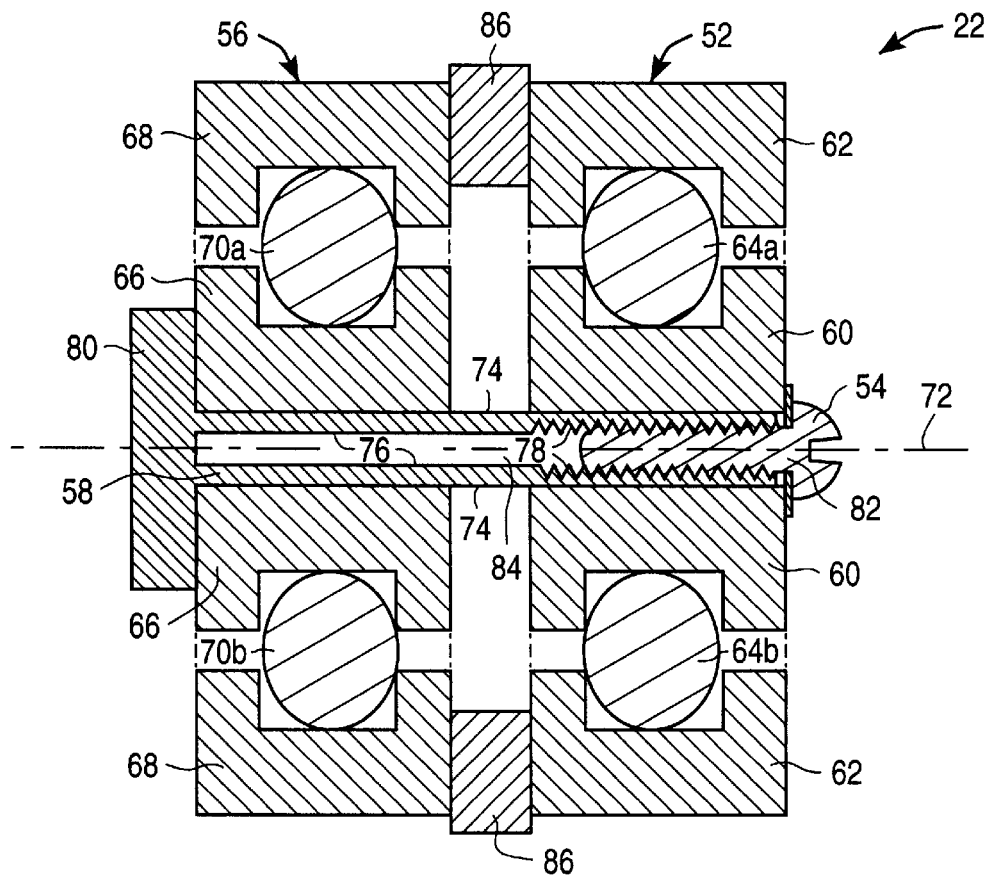
FIG. 4 shows a sectional view of the axle assembly of FIG. 3 obtained along sectional line 101—101.

FIG. 3 is an exploded view of an embodiment of the axle assembly 22 in FIG. 1 or FIG. 2, showing the plan view of a ball bearing 52 which is supported by a fixed member 24, and a center screw 54 providing a fixed center axis about which the lever is pivoted. FIG. 4 is a sectional view taken along sectional line 101—101 in FIG. 3, showing a pair of ball bearings 52 and 56 held in place by the center screw 54 and the hollow cylindrical shaft 58. For the purpose of clear illustration, sections of the lever and sections of the fixed member for supporting the axle assembly 22 are not shown in the sectional view of FIG. 4.

The first ball bearing 52 comprises an inner annulus 60, an outer annulus 62, and a plurality of metal balls including balls 64a and 64b movably positioned between the inner and outer annuli 60 and 62. The second ball bearing 56 preferably has an identical structure as that of the first ball bearing 52, with an inner annulus 66, an outer annulus 68, and a plurality of metal balls including balls 70a and 70b movably positioned between the inner and outer annuli 66 and 68. The inner and outer annuli of the ball bearings 52 and 56 have inside tracks to hold the metal balls in place while allowing freedom of movement when the inner and outer annuli are rotated with respect to each other. The ball bearings 52 and 56 may be conventional ball bearings known to a person skilled in the art.

In an embodiment according to the present invention, the hollow cylindrical shaft 58 has an exterior sidewall 74, an interior sidewall 76, at least a portion 78 of which is threaded to receive the screw 54, an abutting end 80, and an open end 82. The inner annuli 60 and 66 of the first and second ball bearings 52 and 56 are fixedly attached to the exterior sidewall 74 of the cylindrical shaft 58 when the screw 54 is tightly fastened to the cylindrical shaft 58 through its open end 82 to cause the screw 54 and the abutting end 80 of the cylindrical shaft 58 to squeeze the inner annuli 60 and 66 of the ball bearings 52 and 56 closer to each other. The open end 82 of the hollow cylindrical shaft 58 and the threaded portion 78 of the interior sidewall 76 of the cylindrical shaft 58 are sized to fit the screw 54 when it is fastened to the cylindrical shaft 58. A portion of the interior 84 of the cylindrical shaft 58 may remain hollow after the screw 54 is fastened to the cylindrical shaft 58, since it is not necessary to use a long screw to fill up the hollow interior 84 of the cylindrical shaft 58. The cylindrical shaft 58 is rotatable about a center axis 72 which is fixed with respect to the support plate 2 of FIG. 1 or FIG. 2.

Referring to FIG. 4, a spacer 86 is provided between the outer annuli 62 and 68 of the first and second ball bearings 52 and 56 to maintain some spacing between the inner annuli 60 and 66 of the first and second ball bearing 52 and 56, respectively, when the screw 54 is tightly fastened to the cylindrical shaft 58 to push the inner annuli 60 and 66 of the first and second ball bearings 52 and 56 closer together. The spacer 86, which comprises a metal ring in the embodiment shown in FIG. 4, is not in direct contact with the inner annuli 60 and 66 of the first and second ball bearings 52 and 56. Therefore, the squeezing force applied to the inner annuli 60 and 66 of the first and second ball bearings 52 and 56 by the screw 54 and the abutting end 80 of the cylindrical shaft 58 is applied only indirectly to the outer annuli 62 and 68 of the first and second ball bearings 52 and 56.

When a rotational motion is imparted on the inner annuli 60 and 66 of the first and second ball bearings 52 and 56 while the outer annuli 62 and 68 are stationary, the metal balls 64a and 64b of the first ball bearing 52 and the metal balls 70a and 70b of the second ball bearing 56 tend to move closer to the center of the two ball bearings 52 and 56 instead of moving randomly within the tracks of the inner and outer annuli of the ball bearings. Preventing random movements of metal balls within the tracks of the ball bearings thus allows the center axis 72 of the cylindrical shaft 58 to be stabilized while rotational motions are being imparted on the inner annuli 60 and 66 of the ball bearings 52 and 56 by the lever 16 in FIG. 1 or the lever 36 in FIG. 2, for example. An axle assembly with two closely spaced ball bearings as shown in FIG. 4 is able to provide improved axial stability for the lever, thereby preventing the lever from generating undesirable vibrations.

The axle assembly 22 of FIGS. 3 and 4 may be implemented to pivot the lever 16 in FIG. 1 or the lever 36 in FIG. 2 in a variety of manners. For example, the outer annuli 62 and 68 of the first and second ball bearings 52 and 56 may be attached to a fixed member, such as the fixed member 24 in FIG. 1 or the fixed member 34 in FIG. 2, while the cylindrical shaft 58 is attached to a lever, such as the lever 16 in FIG. 1 or the lever 36 in FIG. 2. The lever, which imparts rotational motions to the cylindrical shaft 58, is thus pivoted about a fixed center axis with a high degree of mechanical stability, thereby allowing the optical switching element to be switched to its on and off positions accurately and reliably after a large number of repeated switching operations.

FIG. 5 shows a top plan view of an example of an optical switch to which the mechanical assembly according to the present invention is applicable. The optical switch comprises a plurality of optical switching elements 90a, 90b, . . . 90h which are shown as prisms. Except for the last prism 90h which is a fixed prism connected to the support plate 2, prisms 90a, 90b, . . . 90g are movable with respect to the support plate 2 through a plurality of apertures 93a, 93b, 93d and 93f in the support plate 2. The optical switching elements 90a, 90b, . . 90g are switched between their on and off positions by a plurality of actuators 92a, 92b, . . . 92g connected to a plurality of levers 94a, 94b, . . . 94g. For example, when the optical switching elements 90a and 90e are in their on positions and the optical switching elements 90b, 90c and 90d are in their off positions, light can be transmitted between optical fibers 96 and 98.

Light transmitted from the optical fiber 96 to the optical switching element 90a passes through a collimator lens 100 which is housed in a collimator assembly 102. In a similar manner, light transmitted from the optical switching element 90e to the optical fiber 98 passes through collimator lens 104 which is housed in a collimator assembly 106. The mechanical assembly as shown in FIG. 1 may be implemented for any one of the optical switching elements 90a, 90b, . . . 90g. For example, the sectional view of FIG. 1 may be obtained along sectional line 103—103 for the optical switching element 90f. In an alternate embodiment, the mechanical assembly as shown in FIG. 2 may be used for switching any one of the optical switching elements 90a, 90b, . . . 90g instead of the mechanical assembly of FIG. 1.

FIG. 6 shows a top plan view of an example of an M×N optical switching matrix to which the mechanical assembly according to the present invention is applicable. In FIG. 6, a plurality of optical switching elements 110a, 110b, ... 10e, 112a, 112b, ... 112e, 114a, 114b, ... 114e and 116a, 116b, ... 116e are arranged in an array comprising a plurality of rows and columns. Although the optical switching elements are shown as prisms in FIG. 6, other types of optical switching elements such as mirrors can also be used.

When one of the optical switching elements is in its on position while the optical switching elements are in their off positions, optical transmission can be established between respective input and output fibers. For example, if the optical switching element 112b is switched on while the optical switching elements 110b, 112c, 112d and 112e are switched off, light can be transmitted between optical fibers 118 and 120. In the example shown in FIG. 6, light transmitted from the optical fiber 118 to the prism 112b passes through a collimator lens 122 which is housed in a collimator assembly 124 on the support plate 2. In a similar manner, the light transmitted between the prism 112b and the optical fiber 120 passes through a collimator lens 126 which is housed in a collimator assembly 128.

The mechanical assembly of FIG. 2 can be used for actuating the optical switching elements as shown in FIG. 6. In order to reduce the effect of optical dispersion in an M×N optical switching matrix, the spacings between adjacent columns and adjacent rows of optical switching elements are preferably small to reduce the distances between the optical switching elements and the collimator assemblies. The mechanical assembly as shown in FIG. 2 can be used for actuating the optical switch elements in an M×N optical switching matrix as shown in FIG. 6 to reduce the spacings between adjacent columns and rows of optical switching elements.

The vertically mounted relay switch 32 and the lever 36, which are mounted below the second surface 6 of the support plate 2 as shown in FIG. 2, are not shown in the top plan view of FIG. 6. The mechanical assembly with the vertically mounted relay switch 32 as shown in FIG. 2 for actuating the optical switching element 114d may be located in the space below the support plate 2 between the optical switching elements 114d and 114e, or between the optical switching elements 114d and 116d, for example. The sectional view of FIG. 2 showing the mechanical assembly below the support plate 2 for the optical switching element 114d in FIG. 6 may be obtained, for example, along sectional line 105—105 in FIG. 6.

Applications of the mechanical assembly according to the present invention are not limited to the optical switches as shown in FIGS. 5 and 6 described above. The mechanical assembly according to the present invention is applicable to various types of optical switching elements other than reflector switches. Optical switches in which mechanical assemblies according to the present invention may be implemented for actuating optical switching elements include those described in U.S. patent application Ser. No. 09/416, 038, titled "Mechanically Actuated Optical Switch", filed Oct. 12, 1999, and U.S. patent application Ser. No. 09/416, 441, titled "Mechanically Actuated N×M Optical Switching Matrix", filed Oct. 12, 1999, both of which are incorporated herein by reference.

Figure 7:
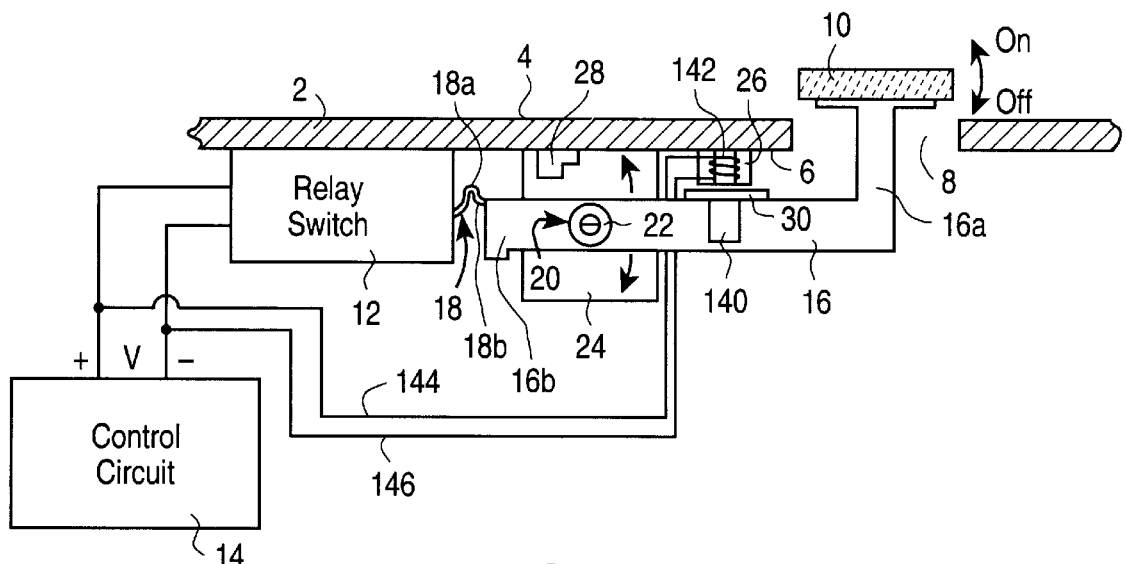
FIG. 7 shows a sectional view of another embodiment of the mechanical assembly according to the present invention similar to FIG. 1, with the additions of a magnet and a solenoid for faster switching of the optical switching element from its off position to its on position.
Figure 8:
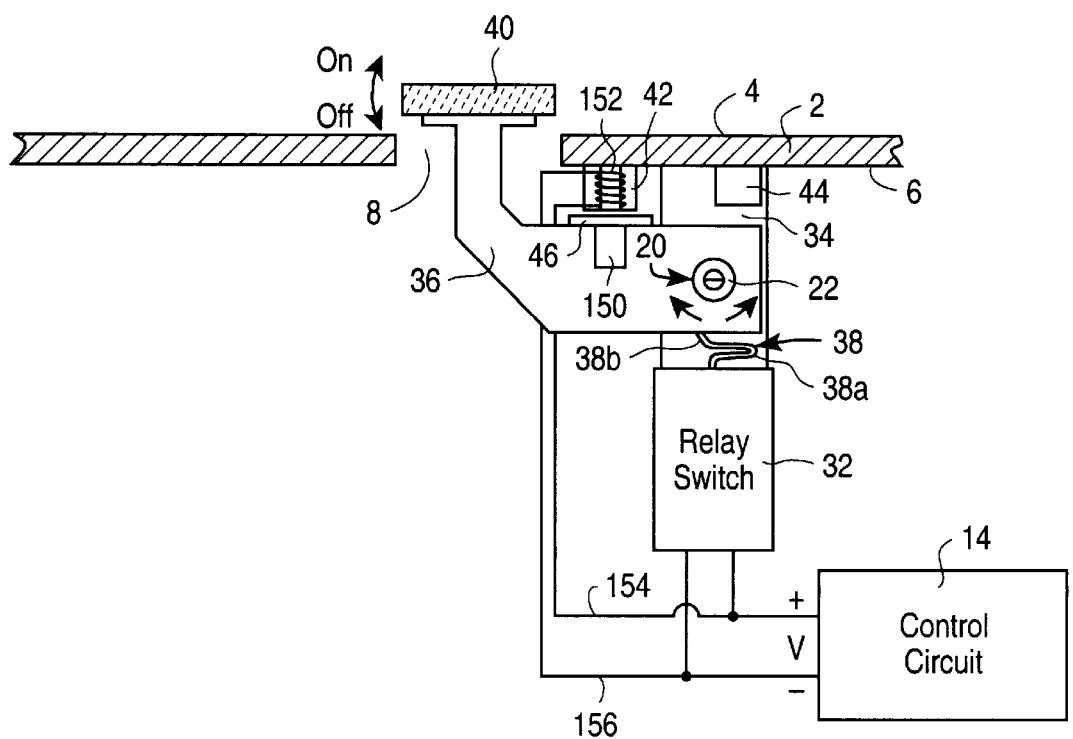
FIG. 8 shows a sectional view of another embodiment of the mechanical assembly according to the present invention similar to FIG. 2, with the additions of a magnet and a solenoid for faster switching of the optical switching element from its off position to its on position.

FIGS. 7 and 8 show further embodiments of the mechanical assembly for an optical switch according to the present invention. FIG. 7 shows an embodiment of the mechanical assembly similar to that which is shown in FIG. 1 and described above, with the additions of a magnet 140 which is connected to the contact pad 30 on the lever 16 and a solenoid 142 which is connected to the second surface 6 of the support plate 2. In an embodiment, the magnet 140 is a permanent magnet which generates a strong magnetic field. The solenoid 142 is connected to the second surface 6 of the support plate 2 at a position opposite the contact pad 30 and the magnet 140. In an embodiment, the solenoid 142 is positioned within the first metal block 26, which is provided with a hollow interior to house the solenoid 142.

In the embodiment shown in FIG. 7, the control circuit 14 supplies an actuating voltage V to the actuator 12. In an embodiment, the actuator 12 generates repetitive movements in opposite directions depending upon the changes in polarities of the actuating voltage V supplied by the control circuit 14. In the embodiment shown in FIG. 7, the actuating voltage V generated by the control circuit 14 is also supplied to the solenoid 142 through conductive lines 144 and 146. When the optical switching element 10 is switched from its off position to its on position, the voltage V supplied by the control circuit 14 forces a current through the solenoid 142 to generate a magnetic field for attracting the permanent magnet 140.

Because of the magnetic force of attraction between the permanent magnet 140 and the solenoid 142 when the optical switching element 10 is moved from its off position to its on position, the switching time for the optical switching element 10 to reach its on position from its off position can be reduced compared to the embodiment shown in FIG. 1 in which the optical switching element 10 relies solely upon the force generated by the relay switch 12 to move to its on position.

Referring to FIG. 7, when the control circuit 14 reverses the polarity of the actuating voltage V to cause the relay switch 12 to move the optical switching element 10 from its on position to its off position, the polarity of the voltage supplied to the solenoid 142 is also reversed. The current through the solenoid 142 thus flows in a reverse direction to generate a reverse magnetic field to repel the permanent magnet 140 downward away from the solenoid 142. The repelling force between the solenoid 142 and the permanent magnet 140 in addition to the force generated by the relay switch 12 causes the optical switching element 10 to move quickly from its on position to its off position when the polarity of the actuating voltage V is reversed.

When the actuating voltage V is supplied to both the relay switch 12 and the solenoid 142 to move the optical switching element 10 to its on position, a strong magnetic force of attraction between the solenoid 142 and the permanent magnet 140 causes the contact pad 30 to move quickly toward the first metal block 26 in addition to the actuating force transferred from the relay switch 12 to the lever 16 through the flexible connector 18. The solenoid 142 and the permanent magnet 140 allow the switching time of the optical switching element 10 from its off position to its on position to be reduced to about 15 ms or less. After the optical switching element 10 reaches its on position, the force of attraction between the permanent magnet 140 and the solenoid 142 ensures that the contact pad 30 is in secure contact with the first metal block 26. In an embodiment, the first metal block 26 comprises a nonferrous metal such as copper or aluminum. In a further embodiment, the contact pad also comprises a nonferrous metal.

FIG. 8 shows a sectional view of an embodiment of the mechanical assembly similar to that which is shown in FIG. 2 and described above, with the additions of a permanent magnet 150 attached to the contact pad 46 and a solenoid 152 on the second surface 6 of the support plate 2. In the embodiment shown in FIG. 8, the solenoid 152 is positioned within the first metal block 42. A hollow interior may be provided in the first metal block 42 to allow sufficient space for the solenoid 152. The control circuit 14, which supplies an actuating voltage V to the relay switch 32 for generating repetitive movements in opposite directions, also supplies the same actuating voltage V to the solenoid 152 through conductive lines 154 and 156.

When the actuating voltage V is applied to the relay switch 32 to move the optical switching element 40 from its off position to its on position, it also causes a current to flow through the solenoid 152 to produce a magnetic field for attracting the permanent magnet 150. With the additional force of magnetic attraction between the permanent magnet 150 and the solenoid 152, the optical switching element 40 can be switched from its off position to its on position within a shorter switching time. When the optical switching element 40 is switched from its on position to its off position, the polarity of the actuating voltage V is reversed to cause the relay switch to generate an opposite motion. The magnetic field produced by the solenoid 152 is also reversed, thereby repelling the permanent magnet 150 downward to move the optical switching element 40 from its on position to its off position.

In an embodiment, conventional solenoids with iron cores may be implemented to attract and to repel the permanent magnets 140 and 150 as shown in FIGS. 7 and 8, respectively. In an embodiment, the contact pads 30 and 46 in FIGS. 7 and 8 may have surfaces wider than the widths of the levers 16 and 36 to allow the permanent magnets 140 and 150 to be attached to the contact pads 30 and 46 at positions external to the levers 16 and 36, respectively. In another embodiment, the permanent magnets may be positioned inside the levers, provided that the levers are made of nonferrous metals. Although the solenoids 142 and 152 are shown as being positioned inside the first metal blocks 26 and 42 in FIGS. 7 and 8, respectively, the solenoids may also be positioned outside the respective first metal blocks in a different embodiment, as long as the solenoids are able to produce sufficiently strong forces of attraction and repulsion on the respective permanent magnets.

The invention has been described with respect to particular embodiments thereof, and numerous modifications can be made which are within the scope of the invention as set forth in the claims.

What is claimed is:

1. A mechanical assembly for an optical switch, comprising:
   (a) an actuator capable of generating repetitive movements in opposite directions;
   (b) an axle assembly, comprising:
      (i) a hollow cylindrical shaft rotatable about a center axis, the cylindrical shaft having an exterior sidewall and an interior sidewall defining a hollow interior and an open end;
      (ii) a screw fastened to the interior sidewall of the cylindrical shaft through the open end;
      (iii) first and second ball bearings each comprising an inner annulus, an outer annulus and a plurality of balls movably positioned between the inner and outer annuli, the inner annuli of the ball bearings attached to the exterior sidewall of the cylindrical shaft; and
      (iv) a spacer positioned between the first and second ball bearings;
   (c) a lever connected to the actuator and the axle assembly, the lever pivoted about the center axis of the cylindrical shaft; and
   (d) an optical switching element, connected to the lever, capable of moving repetitively in opposite directions in response to repetitive movements generated by the actuator.

2. The assembly of claim 1, further comprising a support plate having first and second surfaces opposite each other, the support plate having at least one aperture perforating the first and second surfaces, wherein a portion of the lever adjacent the optical switching element is capable of moving through the aperture to drive the optical switching element to either an on position or an off position.

3. The assembly of claim 2, wherein the off position of the optical switching element is within the aperture, and wherein the on position of the optical switching element is on an optical path above the first surface of the support plate.

4. The assembly of claim 2, wherein the actuator is fixedly connected to the second surface of the support plate.

5. The assembly of claim 4, further comprising a fixed member connected to the second surface of the support plate to support the axle assembly.

6. The assembly of claim 5, wherein the actuator is directly connected to the fixed member.

7. The assembly of claim 4, wherein the actuator is directly connected to the second surface of the support plate.

8. The assembly of claim 2, further comprising first and second blocks fixedly connected to the second surface of the support plate, wherein the first block is positioned to stop the lever from moving farther when the optical switching element reaches the on position, and wherein the second block is positioned to stop the lever from moving farther when the optical switching element reaches the off position.

9. The assembly of claim 1, wherein the actuator comprises a relay switch.

10. The assembly of claim 1, further comprising a flexible connector connected between the actuator and the lever to transfer movements from the actuator to the lever.

11. The assembly of claim 10, wherein the flexible connector comprises at least two metal wires.

12. The assembly of claim 11, wherein the metal wires comprise bent metal wires having different resonant frequencies.

13. The assembly of claim 1, wherein the spacer is connected between the outer annuli of the first and second ball bearings, and wherein the inner annuli of the first and second ball bearings are separated apart by the spacer.

14. The assembly of claim 1, wherein the optical switching element comprises an optical reflector.

15. The assembly of claim 14, wherein the optical reflector comprises a mirror.

16. The assembly of claim 14, wherein the optical reflector comprises a prism.

17. An assembly for driving an optical switching element of an optical switch, the optical switching element capable of occupying an on position to intercept an optical path or an off position away from the optical path, the assembly comprising:
   (a) a support plate having first and second surfaces opposite each other, the support plate having at least one aperture perforating the first and second surfaces, the optical switching element located above the first surface of the support plate when it is in the on position;
   (b) an actuator, connected to the support plate, capable of generating repetitive movements in opposite directions;
   (c) an axle assembly, comprising:

(i) a hollow cylindrical shaft rotatable about a center axis which is fixedly positioned with respect to the support plate, the cylindrical shaft having an exterior sidewall and an interior sidewall defining a hollow interior and an open end;

(ii) a screw fastened to the interior sidewall of the cylindrical shaft through the open end;

(iii) first and second ball bearings each comprising an inner annulus, an outer annulus and a plurality of balls movably positioned between the inner and outer annuli, the inner annuli of the ball bearings attached to the exterior sidewall of the cylindrical shaft; and (iv) a spacer positioned between the first and second ball bearings; and (d) a lever connected to the actuator and the axle assembly, the lever pivoted about the center axis of the cylindrical shaft to drive the optical switching element between the on and off positions.

18. The assembly of claim 17, wherein the off position of the optical switching element is within the aperture of the support plate.

19. The assembly of claim 17, wherein the actuator is fixedly connected to the second surface of the support plate.

20. The assembly of claim 19, further comprising a fixed member connected to the second surface of the support plate to support the axle assembly.

21. The assembly of claim 20, wherein the actuator is directly connected to the fixed member.

22. The assembly of claim 19, wherein the actuator is directly connected to the second surface of the support plate.

23. The assembly of claim 17, further comprising first and second blocks fixedly connected to the second surface of the support plate, wherein the first block is positioned to stop the lever from moving farther when the optical switching element reaches the on position, and wherein the second block is positioned to stop the lever from moving farther when the optical switching element reaches the off position.

24. The assembly of claim 17, wherein the actuator comprises a relay switch.

25. The assembly of claim 17, further comprising a flexible connector connected between the actuator and the lever to transfer movements from the actuator to the lever.

26. The assembly of claim 25, wherein the flexible connector comprises at least two metal wires having different resonant frequencies.

27. The assembly of claim 17, wherein the spacer is connected between the outer annuli of the first and second ball bearings, and wherein the inner annuli of the first and second ball bearings are separated apart by the spacer.

28. The assembly of claim 17, wherein the optical switching element comprises an optical reflector, connected to the lever, capable of moving repetitively in opposite directions in response to repetitive movements generated by the actuator.

29. The assembly of claim 28, wherein the optical reflector comprises a mirror.

30. The assembly of claim 28, wherein the optical reflector comprises a prism.

31. An optical switch, comprising:

(a) an optical switching element capable of occupying an on position to intercept an optical path or an off position away from the optical path;

(b) a support plate having first and second surfaces opposite each other, the support plate having at least one aperture perforating the first and second surfaces, the optical switching element located above the first surface of the support plate when it is in the on position;

(c) an actuator, connected to the support plate, capable of generating repetitive movements in opposite directions;

(d) a lever connected between the actuator and the optical switching element to drive the optical switching element between the on and off positions;

(e) means for stably pivoting the lever; and (f) a flexible connector connected between the actuator and the lever to transfer movements from the actuator to the lever, the flexible connector comprising at least two metal wires having different resonant frequencies.

32. The optical switch of claim 31, wherein the means for stably pivoting the lever comprises:

(i) a hollow cylindrical shaft rotatable about a center axis which is fixedly positioned with respect to the support plate, the cylindrical shaft having an exterior sidewall and an interior sidewall defining a hollow interior and an open end, the cylindrical shaft connected to pivot the lever;

(ii) a screw fastened to the interior sidewall of the cylindrical shaft through the open end;

(iii) first and second ball bearings each comprising an inner annulus, an outer annulus and a plurality of balls movably positioned between the inner and outer annuli, the inner annuli of the ball bearings attached to the exterior sidewall of the cylindrical shaft; and (iv) a spacer, connected between the outer annuli of the first and second ball bearings, to separate the inner annuli of the first and second ball bearings apart from each other.

33. The optical switch of claim 32, wherein the actuator is fixedly connected to the second surface of the support plate.

34. The optical switch of claim 33, further comprising a fixed member connected to the second surface of the support plate to support the axle assembly.

35. The optical switch of claim 34, wherein the actuator is directly connected to the fixed member.

36. The optical switch of claim 33, wherein the actuator is directly connected to the second surface of the support plate.

37. The optical switch of claim 31, wherein the off position of the optical switching element is within the aperture of the support plate.

38. The optical switch of claim 31, further comprising first and second blocks fixedly connected to the second surface of the support plate, wherein the first block is positioned to stop the lever from moving farther when the optical switching element reaches the on position, and wherein the second block is positioned to stop the lever from moving farther when the optical switching element reaches the off position.

39. The optical switch of claim 31, wherein the actuator comprises a relay switch.

40. The optical switch of claim 31, wherein the optical switching element comprises an optical reflector, connected to the lever, capable of moving repetitively in opposite directions in response to repetitive movements generated by the actuator.

41. The optical switch of claim 40, wherein the optical reflector comprises a mirror.

42. The optical switch of claim 40, wherein the optical reflector comprises a prism.

43. The optical switch of claim 31, further comprising:

(g) a metal block fixedly connected to the second surface of the support plate at a position to stop the lever from moving farther when the optical switching element reaches the on position; and (h) a contact pad connected to the lever and positioned to contact the metal block directly when the optical switching element is in the on position.

44. The optical switch of claim 43, further comprising a solenoid connected to the second surface of the support plate.

45. The optical switch of claim 44, wherein the solenoid is positioned within the metal block.

46. The optical switch of claim 44, further comprising a control circuit connected to supply an actuating voltage to the actuator and the solenoid.

47. The optical switch of claim 44, further comprising a magnet connected to the contact pad and positioned to be attracted to the solenoid when the optical switching element is switched from the off position to the on position.

48. The optical switch of claim 47, wherein the magnet comprises a permanent magnet.

49. The optical switch of claim 47, wherein the metal block comprises a nonferrous metal.

50. The optical switch of claim 47, wherein the contact pad comprises a nonferrous metal.

51. An assembly for driving an optical switching element of an optical switch, the optical switching element capable of occupying an on position to intercept an optical path or an off position away from the optical path, the assembly comprising:
   (a) a support plate having first and second surfaces opposite each other, the support plate having at least one aperture perforating the first and second surfaces, the optical switching element located above the first surface of the support plate when it is in the on position;
   (b) an actuator, connected to the second surface of the support plate, capable of generating repetitive movements in opposite directions;
   (c) a fixed member connected to the second surface of the support plate;
   (d) an axle assembly connected to the fixed member;
   (e) a lever connected to the actuator and pivotably supported by the axle assembly to drive the optical switching element between the on and off positions;
   (f) a first metal block fixedly connected to the second surface of the support plate at a position to stop the lever from moving farther when the optical switching element reaches the on position;
   (g) a solenoid connected to the second surface of the support plate;
   (h) a contact pad connected to the lever and positioned to contact the first metal block directly when the optical switching element is in the on position; and
   (j) a magnet, connected to the contact pad, positioned to be attracted to the solenoid when the optical switching element is switched from the off position to the on position.

52. The assembly of claim 51, wherein the axle assembly comprises:
   (i) a hollow cylindrical shaft rotatable about a center axis which is fixedly positioned with respect to the support plate, the cylindrical shaft having an exterior sidewall and an interior sidewall defining a hollow interior and an open end;
   (ii) a screw fastened to the interior sidewall of the cylindrical shaft through the open end;
   (iii) first and second ball bearings each comprising an inner annulus, an outer annulus and a plurality of balls movably positioned between the inner and outer annuli, the inner annuli of the ball bearings attached to the exterior sidewall of the cylindrical shaft; and
   (iv) a spacer positioned between the first and second ball bearings.

53. The assembly of claim 52, wherein the spacer is connected between the outer annuli of the first and second ball bearings, and wherein the inner annuli of the first and second ball bearings are separated apart by the spacer.

54. The assembly of claim 51, wherein the off position of the optical switching element is within the aperture of the support plate.

55. The assembly of claim 51, wherein the actuator is directly connected to the fixed member.

56. The assembly of claim 51, wherein the actuator is directly connected to the second surface of the support plate.

57. The assembly of claim 51, further comprising a second metal block fixedly connected to the second surface of the support plate at a position to stop the lever from moving farther when the optical switching element reaches the off position.

58. The assembly of claim 51, wherein the actuator comprises a relay switch.

59. The assembly of claim 51, further comprising a flexible connector connected between the actuator and the lever to transfer movements from the actuator to the lever.

60. The assembly of claim 59, wherein the flexible connector comprises at least two metal wires having different resonant frequencies.

61. The assembly of claim 51, wherein the optical switching element comprises an optical reflector, connected to the lever, capable of moving repetitively in opposite directions in response to repetitive movements generated by the actuator.

62. The assembly of claim 61, wherein the optical reflector comprises a mirror.

63. The assembly of claim 61, wherein the optical reflector comprises a prism.

64. The assembly of claim 51, wherein the magnet comprises a permanent magnet.

65. The assembly of claim 51, wherein the solenoid is positioned within the first metal block.

66. The assembly of claim 51, further comprising a control circuit connected to supply an actuating voltage to the actuator.

67. The assembly of claim 66, wherein the control circuit is connected to supply the actuating voltage to the solenoid.

68. The assembly of claim 51, wherein the first metal block comprises a nonferrous metal.

69. The assembly of claim 51, wherein the contact pad comprises a nonferrous metal.

* * * * *